United States Patent [19]

Gougeon et al.

[11] 4,420,354
[45] Dec. 13, 1983

[54] PROCESS FOR SECURING PROJECTING STUDS IN THE ENDS OF WOOD RESIN COMPOSITE BODIES AND THE LIKE AND THE STRUCTURE FORMED THEREBY

[75] Inventors: Meade A. Gougeon; Jan C. Gougeon, both of Bay City, Mich.

[73] Assignee: Gougeon Brothers, Inc., Bay City, Mich.

[21] Appl. No.: 387,930

[22] Filed: Jun. 14, 1982

[51] Int. Cl.$^3$ .............................................. B29B 31/00
[52] U.S. Cl. .................................. 156/242; 156/153; 156/245; 156/293; 264/274; 264/328.1; 264/328.6
[58] Field of Search .............. 156/242, 245, 293, 294, 156/39, 153, 630; 264/328.1, 328.6, 274

[56] References Cited

U.S. PATENT DOCUMENTS

| 2,450,482 | 10/1948 | Morin | 264/328.1 |
| 2,889,582 | 6/1959 | Cooper | 156/294 |
| 4,224,971 | 9/1980 | Müller et al. | 156/71 |
| 4,255,735 | 3/1981 | Liautaud | 264/274 |

Primary Examiner—David A. Simmons
Assistant Examiner—Timothy W. Heitbrink
Attorney, Agent, or Firm—Learman & McCulloch

[57] ABSTRACT

A process for providing attaching ends projecting from a wood-resin composite veneer body such as the end of an elongate, hollow windmill blade, and wherein the attaching ends are provided on studs which are resin bonded in position in elongate enlarged openings formed in the ends of the bodies and have threaded ends or the like projecting therefrom. The process involves the preforming or precasting of resin sleeves of predetermined thickness around the plug ends of the studs to leave the attaching ends projecting therefrom, prior to inserting of the studs into the enlarged openings provided in the composite body. Curing of the sleeves thus occurs remotely from the wood-resin body. Thereafter the studs, with the resin sleeves now enveloping their bodies, except for the projecting attaching ends, are located in openings in the composite body and a relatively thinner coating of the same adhesive is applied between the precast sleeves and the opening walls which, when it hardens in an exothermic reaction, does not give off sufficient heat to deleteriously affect either the bond between the studs and the body, or the bond between the wood layers of the hollow blade sections.

12 Claims, 4 Drawing Figures

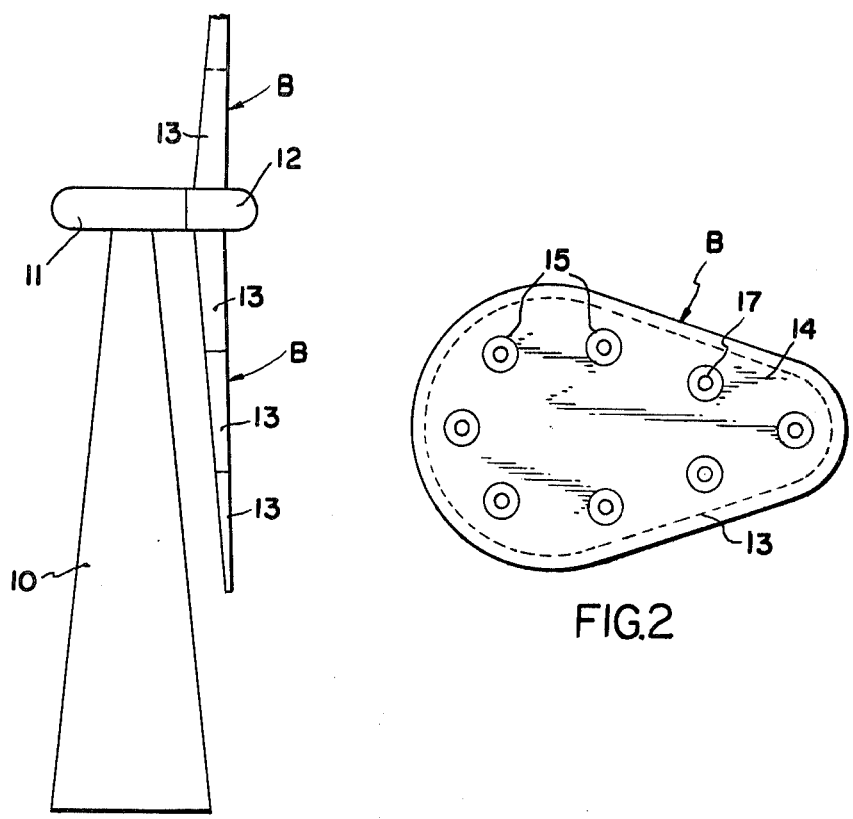
FIG.1
FIG.2
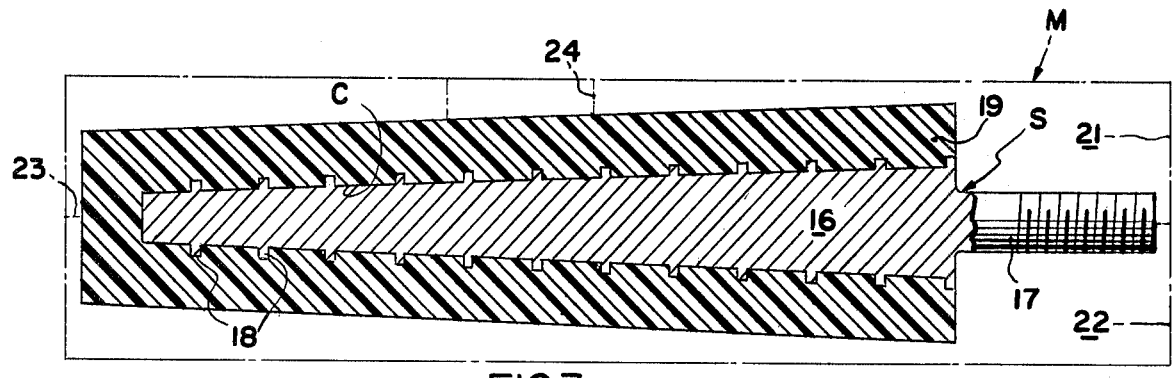
FIG.3
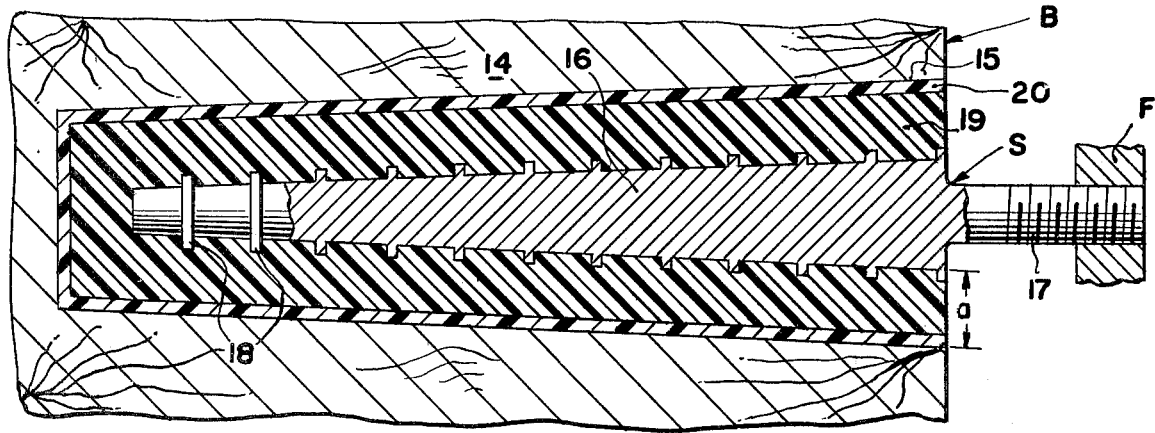
FIG.4

PROCESS FOR SECURING PROJECTING STUDS IN THE ENDS OF WOOD RESIN COMPOSITE BODIES AND THE LIKE AND THE STRUCTURE FORMED THEREBY

FIELD OF THE INVENTION

The invention relates to a process for providing attaching ends projecting from a wood-resin composite body, such as an elongate hollow windmill blade, to permit such blades to be secured to the rotor structure of the windmill.

BACKGROUND OF THE INVENTION

There is considerable interest today in the further development of wind power energy. Relatively huge wind motor structures are being erected in selected portions of the world where constantly high velocity wind conditions prevail, and power can be derived therefrom in economically feasible installations. The blades for such machines may be as much as 175 feet in length, and it has been determined that light weight blades formed of a composite synthetic plastic resin-wood construction are well-suited to such applications and are superior in many respects to other materials. For example, such structures possess the necessary strength but do not have the same "fatigue" problems as do blades fashioned from other materials.

For purposes of strength, epoxy resin adhesives have been used to bond the wood layers which form the hollow blade and, as is well known, such adhesive resin materials include both a resin and a hardener or curing agent which when the two components are placed in contact, initiate the hardening process. Because exceptionally strong bonds are required, it is proposed to use such a two component adhesive material, or a compatible material, with suitable inert strengthening filler material, to anchor the alloy metal studs or anchor bolts which are designed to project from the end of the blade, and permit the blade to be securely anchored to the rotor structure.

Studs of the type which are contemplated include an elongate, generally frustoconical plug body with axially spaced projecting radial flanges, fins or threads, and a reduced size, axially extending, attaching end which normally is threaded. Because such projecting studs are subject to huge aerodynamically imposed shear and torsional stresses, the use of a considerable body of filler-adhesive is necessary to bond the studs in properly located positions.

When, in the past, such studs have been adhesively secured in position, problems have been encountered with the entrapment of air in the filler material and the formation of air pockets in the cured material. Further, the considerable heat given off in the exothermic hardening or curing of such bodies of resinous material has exacerbated the problems. Moreover, the location of the studs in the enlarged openings provided in the ends of the composite wood-resin blades has been tricky, and problems have been encountered with loss of the resin material from the openings during the process, to the extent that dams have had to be built to retain the material in the openings.

SUMMARY OF THE INVENTION

The present invention has solved the aforementioned difficulties by providing a process in which the major portion of the adhesive resin (with incorporated filler) to accomplish the bonding result is first cast or molded in place around the plug portion of the stud only, and then cured to a hardened condition prior to the insertion of the stud in the opening in which it is to be secured. In the process to be described, only the plug portions of the studs are encapsulated in a precast frustoconically extending sleeve corresponding to the frustoconical configuration of the stud body. Once hardening is accomplished, then a thinner coating of the same, or a compatible, resin is applied between the sleeves formed and the marginal walls of the openings and this coating is then hardened in situ to complete the bonding operation. This procedure has been found extremely advantageous since the formation of air pockets is substantially eliminated in the precasting operation and the heat given off by the relatively thinner coating in the exothermic curing thereof is not sufficient to deleteriously effect the bond which is required.

Accordingly, it is an object of the invention to provide an improved process for rigidly securing the plug bodies of the studs in position in the pattern of openings provided to accommodate them in the ends of the windmill blade structure, in a manner such as to leave their usually threaded ends free and projecting axially to permit the attachment to the rotor to take place via a bolting operation or the like.

It is another object of the invention to provide a process and structure which effectively distributes the stress loads imposed by high winds over a sufficiently extended area to avoid stress concentration.

Still another object of the invention is to provide an economical process which makes it possible to more easily locate the studs, while at the same time, avoiding harmful heat conditions and providing the necessary strong bonds required in a structure of this character.

Still another object of the invention is to provide an economic and reliable process which can be readily carried out in the blade manufacturing plant at ambient temperatures, and which does not require complicated jigging or fixturing.

Still a further object of the invention is to provide a low weight, low cost structure permitting a secure connection between different materials such as steel alloys and synthetic resins which have very different modulii of elasticity in a manner to avoid large amplitude aero-elastic vibration.

Various prior art suggestions involved with this subject matter, which do not, however, teach what is claimed are to be found in the following U.S. Pat. Nos.:

1,707,235
4,094,222
4,100,954
4,148,594
4,180,369
4,224,971
4,278,401

Other objects and advantages of the present invention will be pointed out specifically or will become apparent from the following description when it is considered in conjunction with the appended claims and the accompanying drawings, wherein:

FIG. 1 is a schematic view, generally illustrating a windmill structure of a type with which the invention may be employed;

FIG. 2 is an enlarged, end elevational view of one of the windmill blades;

FIG. 3 is a greatly enlarged, end elevational view disclosing a schematically depicted mold for precasting the resin sleeve around the plug body of the stud; and FIG. 4 is a fragmentary, sectional side elevational view showing one of the studs anchored in place in the end of the wood-resin composite structure with its attaching end protruding therefrom.

Directing attention in the first instance to FIG. 1, a windmill base or pedestal 10 is shown as supporting a generator body 11, having a rotor nose 12 to which elongate windmill blades generally designated B are secured. The blades B comprise hollow, composite wood-resin structures 13 which may be anchored in tandem to form the blade B which then is secured to nose 12. The blades B are suitably reinforced in that blade shaped hollow bodies 13 are formed of resin impregnated wood layers, which are tightly bonded to form a unitary structure.

At its inner end the blade structure B includes a wood block 14 in which a series of openings 15 of a frustoconical configuration have been bored in an air foil or blade shaped pattern, as shown in FIG. 2.

As FIG. 4 particularly indicates, each opening 15 provided is considerably larger in both minimum and maximum diameter than the frustoconical body portion 16 of the stud S which is to be secured therein. Each metal alloy stud S has a reduced projecting threaded attaching end 17 permitting the blade B to be bolted to the nose 12 and further has axially spaced apart annular integral flanges, rings or threads 18 which uniformly project radially substantially the same distance from that portion of the plug body 16 on which they are situated.

As FIG. 4 indicates, to rigidly bond the stud body 16 in place in a manner to withstand the tremendous forces to which it will be subject, requires a thickness a of resin adhesive and filler made up by both a sleeve 19 and a sleeve 20.

In former practice, this entire body of thickness a was formed in the opening 15 and cured in situ. Not only was air pocket formation a problem, but also material tended to run out of the opening 15, and the heat given off during the exothermic curing step was extreme.

The present process differs in that a chilled mold, generally designated M in FIG. 3, is used to precast sleeve 19 completely around the stud body 16. The mold shown in FIG. 3 is only schematically disclosed as consisting of an upper half 21 and a lower half 22 partible along a surface 23, and having a closable sprue 24 which is closed once the two component adhesive is supplied to mold M.

Mold M is formed of a material to which the epoxy or other adhesive body 19 will not adhere. A typical two-component adhesive may, for example, have, as a first component, a slowly reactive unsaturated polyester resin with an accelerator, for example, diethyl aniline, and as a second component organic peroxide. Other possible bonding agents are alkyd resins, vinyl compounds, acrylic resins, and similar substances.

Specifically an epoxy resin is preferred because cured epoxy adhesives have outstanding mechanical properties, dimensional stability, resistance to heat and chemicals, and good adhesion to a wide range of materials. These thermosetting resins can be cured by copolymerization with hardeners, or by homopolymerization with catalysts to form tough infusible epoxy plastics, and most such systems can be cured at room temperature. They may comprise two part or one part systems. One part epoxy systems are formulated with latent curing agents, activatable with heat or moisture.

Conventional epoxy resins may be formed by the reaction of epichlorohydrin with polyhydroxy compound, such as bisphenol-A, in the presence of a catalyst. These epoxys are known as bisphenol-A epichlorohydrin resins. Other epoxy resins are known as epoxy novalak resins and are basically novalak resins whose phenol hydroxyl groups have been converted to glycidyl ethers. A third type of epoxy is the p-amino phenol epoxy made by the epoxidation of a primary amine and an aromatic hydroxyl via the epichlorohydrin route and which may be described as triglycidyl derivaties of p-amino phenol. These may be used as the cycloaliphatics produced by the peracetic acid epoxidation of cyclic olefins. Suitable reinforcing fillers for these compounds include glass fibres, asbestos fibres, cotton fibres, synthetic fibres, and graphite fibres. Such fibres reduce shrinkage in the mold during curing to avoid cracking. The liquid resin-hardener compound supplied to mold M, to fill the mold cavity c, therein is supplied in a sufficiently flowable state to readily fill the mold cavity c.

In preparation for the casting step, the plug body 16 and its radial flanges 18 are either sand blasted or immersed in a commercial etching bath suitable for the metal alloy stud involved. In each instance, the threaded end 17 is protected so as not to damage the threads thereon. Since the hardener is incorporated with the resin, the sleeve 19 will cure in place in the mold M, and thereafter the mold M parts may be separated to remove the encapsulated stud S therefrom. The considerable heat given off in the exothermic curing of the sleeve 19 is dissipated without harm and mold M may be a cooled mold for this purpose.

Because of the fins 18, the stud plug body 16 is positively prevented from any tendency to separate from sleeve 19. It will be noted, further, that the mold cavity c is so formed, that the sleeve 19 is of uniform thickness around stud body 16 and also at the inner end of stud body 16.

Once all of the studs S have been provided with cured sleeves 19 in the manner disclosed, then they are placed in a fixture F (see FIG. 4) and all are simultaneously inserted into the openings 15 to precisely locate them axially therein.

Prior to the fixturing or positioning of the stud bodies 16 in the openings 15, the exterior of sleeves 19 are subjected to a sand-blasting or suitable chemical etching procedure to roughen up their surfaces, and thereafter an epoxy coating 20 of the same material as material 19, but in a less thick coating and substantially more viscous state is applied to the complete exterior surface of the sleeves 19, and to the complete interior wall surfaces of openings 15. Generally, sleeves 19 should be 60%–80% of the thickness "a" of combined sleeves 19 and 20.

The material 20 is relatively viscous, as compared with the material 19, but likewise will consist of a filled resin-hardener compound epoxy or compatible adhesive which will adhere to both sleeve 19 and the interior wood surfaces of openings 15. Because the sleeve 20 is relatively thinner, the heat given off in exothermic curing of the coating 20 in situ is much reduced (more than 50%). Moreover, because these elongate blades are, for practical reasons, in horizontal position when studs S are being bonded into position, problems incident to the loss of material from the openings 15 are minimized, and no damming of the openings 15 is necessary. The ends 17 of the studs S are not threaded into the fixture, but are releasably clamped therein in a manner such that, once the coatings 20 harden to form their surrounding sleeves, the fixture F which clamps also to blade B and holds all of the studs S can simply be released and removed.

While one embodiment of the invention has been described in detail, it will be apparent to those skilled in the art that the disclosed embodiment may be modified. Therefore, the foregoing description is to be considered exemplary, rather than limiting, and the true scope of the invention is that defined in the following claims.

What is claimed is:

1. A process for securing projecting metallic studs in fixed located position in composite structures such as the ends of elongate hollow windmill blades wherein the blades have bonded synthetic plastic wood-resin composite bodies with an end plate formed by a block in which the studs are to be bonded, comprising the steps of:
   a. roughing frustoconical-shaped plug bodies of the studs while substantially protecting threaded ends projecting therefrom;
   b. casting frustoconical exothermically curing resin-hardener-filler sleeves of predetermined thickness around the plug body of each stud only, in a mold, while leaving the projecting threaded ends free of the resin;
   c. curing the sleeves in the mold to harden them and then removing the studs from the mold with the hardened sleeves encapsulating them;
   d. forming a plurality of frustoconical stud receiving openings in a predetermined pattern, in the block following the general configuration of the blade perimeter;
   e. inserting the plug portions with encapsulated cured sleeves thereon into the openings and providing a more viscous coating of substantially lesser thickness than said sleeves of the same, or a compatible, resin between the internal walls of the openings and the sleeves;
   f. locating the sleeves and the plugs in fixtured positions in the openings to protrude the threaded ends in predetermined projected position and relatively spaced apart positions; and
   g. curing the coatings in situ with the release of insufficient heat to interfere with bonding of the coatings to both the sleeves and marginal walls of the openings.

2. The process of claim 1 wherein the plug bodies have radial flanges and are roughened by one of the group of steps comprising sandblasting them, and immersing them in an etching bath.

3. The process of claim 1 wherein the casting of said sleeves is provided by inserting the plug bodies in a partible mold having frustoconical shaped mold openings to which the resin used to form said sleeves will not adhere, and filling the mold cavities with the resin and curing agent in liquid form.

4. The process of claim 1 in which said resin is an epoxy.

5. The process of claim 1 in which the surfaces of the frustoconical shaped wedge sleeves formed are cleaned and roughened after casting.

6. The process of claim 5 wherein the step of claim 5 is performed by one of the group of steps comprising sand blasting and chemical etching.

7. The process of claim 1 wherein the coatings are epoxy and are provided by spreading the resin and curing agent on the hardened sleeves and the interior walls of the openings.

8. The process of claim 1 wherein the curing of the coatings is achieved at ambient room temperature.

9. The process of claim 8 wherein the locating of the plug sleeves in said openings is performed by inserting the plugs in a unitary fixture releasably clamping to a blade section.

10. A process for providing attaching ends projecting from a composite body such as the ends of elongate hollow windmill blade sections formed of bonded resin-wood composite bodies and having end plates at the ends to be secured containing a series of openings in a predetermined spaced apart pattern in each end plate in which plug ends of studs having such projecting attaching ends are bonded, the structure being formed by:
   a. forming resin-hardener-filler sleeves of predetermined thickness around the plug ends of said studs to leave the attaching ends projecting therefrom and curing the sleeves to securely bond the sleeves to the plug ends;
   b. then locating the cured sleeved plug ends of the studs perimetrally in said openings and providing a compatible resin coating bonding to both said sleeves and marginal walls of the openings to fill the space between said sleeves and marginal walls, and curing the coatings to bond the sleeves to the opening walls.

11. The process of claim 10 in which the sleeved plug ends are 60%–80% of the combined thickness of the sleeves and coatings.

12. The process of claim 11 in which reinforcing filler fibres are provided in both said sleeves and coatings.

* * * * *